A. RINGLAND.
ANNULAR BEARING.
APPLICATION FILED JUNE 27, 1912.
1,181,407.
Patented May 2, 1916.
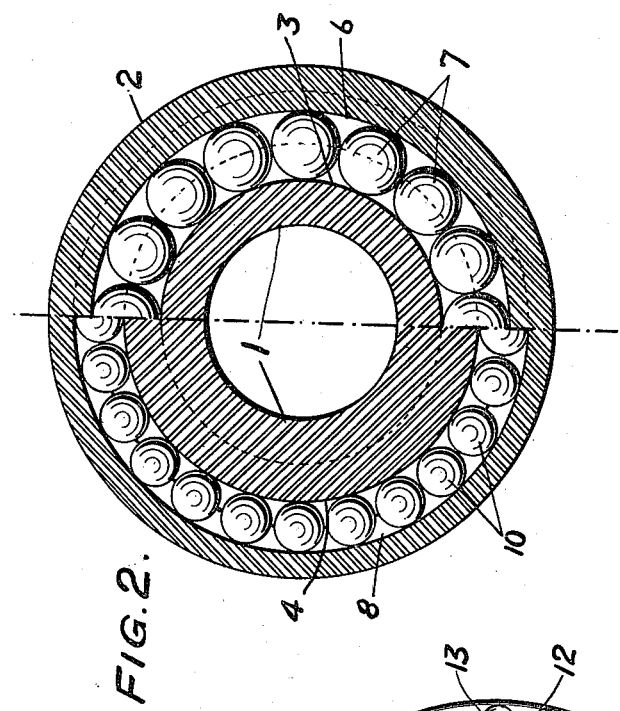
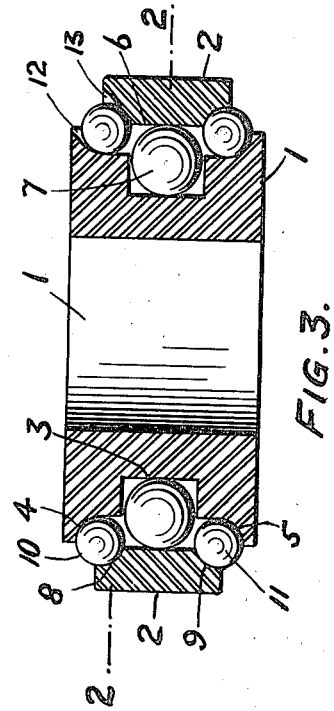
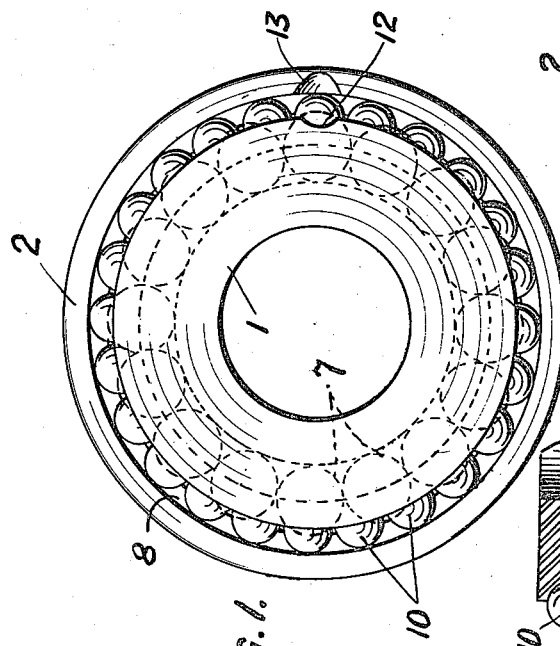
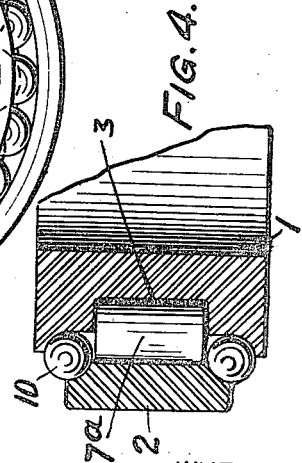
WITNESSES:
INVENTOR
Albert Ringland
BY
Augustus B Stoughton
ATTORNEY.

UNITED STATES PATENT OFFICE.

ALBERT RINGLAND, OF PHILADELPHIA, PENNSYLVANIA, ASSIGNOR TO STANDARD ROLLER BEARING COMPANY, OF PHILADELPHIA, PENNSYLVANIA, A CORPORATION OF NEW JERSEY.

ANNULAR BEARING.

1,181,407.     Specification of Letters Patent.     Patented May 2, 1916.

Application filed June 27, 1912. Serial No. 706,157.

*To all whom it may concern:*

Be it known that I, ALBERT RINGLAND a citizen of the United States, and a resident of Philadelphia, in the county of Philadelphia and State of Pennsylvania, have invented certain new and useful Improvements in Annular Bearings, of which the following is a specification.

The principal objects of the present invention are to provide an annular ball bearing capable of sustaining radial thrust and end thrust in either direction; to provide a construction such that the parts thereof can be cheaply produced and satisfactorily hardened, and to provide a compact annular bearing capable of handling or taking care of comparatively severe loads.

The invention will be claimed at the end hereof, but will be first described in connection with the embodiment of it chosen for illustration in the accompanying drawings, in which—

Figure 1, is a side view. Fig. 2, a section on the line 2—2 of Fig. 3. Fig. 3, a transverse sectional view, and Fig. 4, a sectional view illustrating a modification.

The bearing, Figs. 1 to 3, inclusive, comprises an inner ring 1 and an outer ring 2; the former being somewhat wider than the latter. The inner ring is provided with a radial thrust ball race 3 for the balls which carry the radial load. This race is shown as the cylindrical bottom of a groove formed around the outside of the inner ring. Upon opposite sides of the race 3 are the elements 4 and 5, of a cup-and-cone bearing. As shown these elements are of the form of flanges projecting from the inner ring and having curved confronting surfaces. The outer ring is provided with a radial thrust race 6 for the balls 7, which carry the radial load, and upon opposite sides of that race the outer ring is provided with the other elements 8 and 9 of a cup-and-cone bearing. As shown the race 6 is cylindrical and projects inwardly from the outer ring, and on each side of the race are curved surfaces. The set of balls 10 and the set of balls 11 respectively run in the respective cup-and-cone races, and they take the end thrusts or loads. 12 and 13 are filling notches for the introduction of the balls 10.

Referring to Fig. 4, the rollers 7ª are employed instead of the balls 7 and the diameter and length of these rollers may be made appropriate for carrying or sustaining the radial thrust.

The bearing may be assembled by first dropping in the set of balls 11 and then dropping in the balls 7 and finally introducing the balls 10 through the filling openings.

While I have described what is called a full type bearing, meaning that there is a complete circle of balls, still the invention may be embodied in what is called a silent type bearing in which the balls, or some of them, are separated or spaced as by means of a cage or the like.

As shown the balls 7 are somewhat larger than the other balls, but the size of the balls, as well as the relative size thereof, are subject to change and modification.

By radial thrust races is meant races between which rolling elements (the balls or rollers) run and by which there is afforded some lateral movement, and such races are usually cylindrical surfaces.

What I claim is:

1. A self contained annular ball bearing comprising the combination of concentric inner and outer one piece rings of which the outer one is relatively narrow and is provided with a ball inlet notch and each ring having a centrally arranged radial thrust ball race and each ring having formed on each side of the centrally arranged race the race elements of a cup and cone bearing, making three ball races in all, and three sets of balls arranged respectively in said races and whereof one set takes radial thrust and the other two sets take end thrust, substantially as described.

2. A self contained annular ball bearing comprising the combination of concentric inner and outer one piece rings of which the outer one is relatively narrow and is provided with a ball inlet notch and each ring having a centrally arranged radial thrust race and each ring having formed on each side of the centrally arranged race the race elements of a cup and cone bearing, rolling elements arranged between the radial thrust races, and balls arranged between the cup and cone bearings, substantially as described.

In testimony whereof I have hereunto signed my name.

ALBERT RINGLAND.

Witnesses:
R. S. WOODWARD,
J. T. O'NEILL.